May 11, 1948.  A. C. KORTE ET AL  2,441,421
DYNAMOELECTRIC MACHINE COMMUTATION
Filed June 28, 1946

INVENTORS
ALFRED C. KORTE
ALEX N. SZWARGULSKI
BY George R. Ericson
ATTORNEY

Patented May 11, 1948

2,441,421

UNITED STATES PATENT OFFICE 2,441,421

DYNAMOELECTRIC MACHINE COMMUTATION

Alfred C. Korte and Alex N. Szwargulski, St. Louis, Mo., assignors to Carter Carburetor Corporation, St. Louis, Mo., a corporation of Delaware Application June 28, 1946, Serial No. 679,912

16 Claims. (Cl. 171—228)

1

This invention relates to dynamo-electric machines of commutator type, as direct-current motors and the like, and has particular reference to improvements in the commutating means of such machines, serving to promote good commutation, and effective to reduce or minimize commutator wear and to suppress or inhibit arcing at the brush terminals, thereby avoiding the destructive effects on the commutator and brushes usually attending such arcing. The commutation improvements according to the present invention and as will hereinafter appear, are directed in particular, to overcoming the increased difficulties of commutation and wear encountered in the operation of motors for example, while submerged in fluid such as gasoline and wherein the commutating parts are exposed to or bathed in the fluid.

Dynamo-electric machines of the commutator type, as motors, generators and the like, by reason of electrical operating conditions inherent in such machines, long have posed difficulties in the way of the attainment of perfect or at least highly efficient commutation under all loads, effected without inordinate wear of commutator and brush elements and with a complete absence of so-called "brush sparking" or arcing at the brush terminals and/or inordinate heating of the commutating parts in consequence of high short circuit currents and high current densities in restricted areas of brush-commutator contact. As is well known, efficient commutation is much more difficult to secure in the instance of high voltage, large current capacity machines because of the complexity of factors involving the commutation function. For example, in the larger machines due account must be given to such factors among others, as self induction in the armature coil or coils undergoing commutation; mutual induction between adjacent armature coils; the effects of armature reaction, and the influence of the field pole tips. On the other hand, in the instance of relatively low voltage, small current capacity machines, as small low voltage motors for example, the commutation difficulties are much less pronounced, and substantially arcless commutation and longer mechanical life of the commutator parts have been attained, without complicated expedients found necessary or highly desirable in the larger machines. For example, satisfactory commutation in the small machine may be had by the employment of suitable brushes selected in respect to material, hardness and commutator-contact lubricating and polishing factors, so as to reduce commutator

2 wear and inordinate wear of the brushes, while affording desirable commutating characteristics such as will avoid brush sparking to a material degree. It is a usual practice particularly in connection with low voltage direct-current motors, to provide identical positive and negative brushes of carbon, graphite or the like, controlled as to hardness by finely divided metal, as copper, silver, or other metals, interspersed throughout the brush. In addition, the metal content serves to increase the strength and durability of the brush, and by properly regulating the proportion of metal to carbon, excessive commutator wear can be avoided.

The foregoing concerns in particular, commutator machines of known and prevailing types operating in the presence of air or other gaseous medium not inimical to machine operation. However, where a commutator machine, as for example, a low voltage direct-current motor, is to be operated while submerged in gasoline or other hydrocarbon fluid, such that the commutator and brush elements are partly or completely bathed in the fluid, efficient commutation and a desirably long wear and operating life of the brush and commutator parts, are less readily attainable. Furthermore, it has been found that the usual commutating expedients including carbon or carbon-metal brushes having characteristics suitable to satisfactory commutation in motors operating in the presence of air, may not be used in submerged motors with any practical degree of success. Applicant's experience has shown in respect to the commutating function of a relatively low voltage direct-current motor operating submerged in gasoline, that there exists a greater tendency to excessive commutator wear by brushes of ordinary types employed in small motors generally, and that commutator wear by the negative brush is very much more pronounced than the wear caused by the positive brush. Under this condition there is a greater tendency to brush sparking, particularly at the trailing brush tips, with pitting of the coacting brush and commutator surfaces, and in many instances an appreciable particle separation from the commutating elements. With regard to the latter effect upon the commutator segments in particular, arc-burning or tearing out of metal portions of the segments appears almost entirely at the negative brush, although without control of the short-circuit current in the armature coil or coils undergoing commutation at the positive brush, some small degree of commutator burning may occur on the positive side.

As a means for overcoming the above stated difficulties which in part, are inherent in commutator machines, but which are more pronounced and somewhat altered in character, in an electric motor for example, operating submerged in fluid such as gasoline, the present improvements propose a novel character of resistance control of the commutating means, which is found to be fully effective to the end of minimizing both commutator and brush wear, suppressing brush sparking to a point of practical elimination of arcing, and otherwise improving the commutating function in an electric motor operating under the submerged condition indicated. As now provided in the hereindisclosed presently preferred embodiment of the invention, the positive and negative brushes composed of carbon without interspersed metal content in the negative brush and with or without some metal in the positive brush, are formed or selected such as to have markedly different resistance characteristics. The negative brush formed, as is the positive brush, to have adequate mechanical strength, is characterized by a predetermined longitudinal resistance, as in the direction of main motor current flow therethrough, and very importantly herein, by a predetermined contact resistance at its surface contact with the commutator segments, which is greater in ohmic value than the longitudinal resistance. The positive brush on the other hand, has a longitudinal resistance and a contact resistance each of an appreciable ohmic value, but lower than the corresponding resistance factor in the negative brush. In addition, and in order to facilitate the use of brushes of the above indicated character without serious impairment of the effective power capacity of the motor, the resistance of the commutator winding is reduced to a desirable extent, for example by the use of coil-forming wire of larger cross-section, so that the commutator coil resistance may be appreciably less than is normally encountered in like motors intended for operation in the presence of air.

While it is appreciated that the present improvements may be utilized perhaps with considerable advantage, in commutator motors operating in air, the character of resistance control of commutation as herein afforded, has been found to be highly effective in meeting the increased commutation difficulties encountered in the operation of electric motors when submerged in fluid such as gasoline. Reference may be had to Patent No. 2,261,915 to Korte and Lannert, issued November 4, 1941, wherein is shown an electric fuel pump for automobiles, in which the pump motor is submerged in the fuel tank, and as an example of the utility of the present invention, the improvements above referred to, are herein shown and described in application to the motor of such fuel pump.

In the accompanying drawing illustrative of the invention

Figure 1:
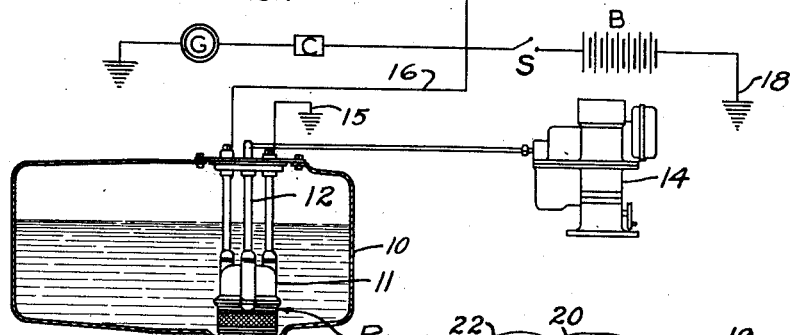
Fig. 1 is a diagrammatic view showing an electric fuel pump of the type shown in the above mentioned Korte and Lannert patent, and the external motor energizing circuit.
Figure 3:
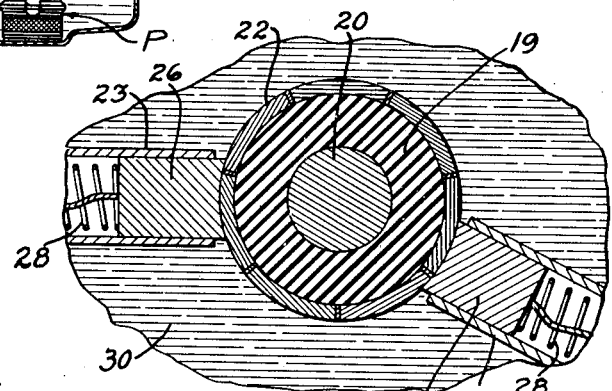
Figure 2:
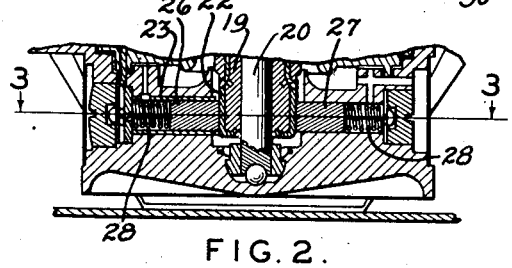
Fig. 2 is an enlarged vertical section of the pump as taken in the region of the motor brush and commutator structure.
Figure 4:
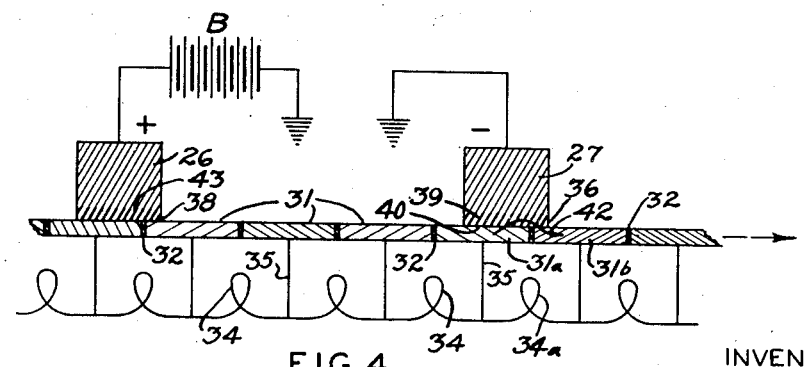

Fig. 3 is an enlarged section taken on line 3—3 in Fig. 2, showing the submerged condition of the commutator and brushes, and Fig. 4 is a diagrammatic developed view of the commutator, commutator coils and brushes, The electric fuel pump P shown in Fig. 1 as completely submerged in gasoline within the fuel tank 10, the latter usually being located at the rear of an automotive vehicle, has its operating motor connected in the automotive electrical circuit illustrated diagrammatically, including the generator G, battery B, reverse-current cut-out C, and ignition switch S. The pump proper and its operating motor are enclosed in a casing 11 suitably supported from a wall or top of the fuel tank 10, and extending from the discharge side of the pump is a fuel conduit 12 leading to the carburetor 14 of the vehicle engine (not shown). One side of the pump motor, as the negative brush terminal thereof presently to be described, is grounded at 15, conveniently through the vehicle frame (not shown) while the other or positive terminal side is connected by a wire 16 to the battery-generator circuit wherein the battery negative terminal is grounded at 18, as to the vehicle frame.

Fig. 2 shows the pump impeller 19 carried by and in driven connection with the lower end portion of the motor shaft 20, and on the shaft below the impeller is the motor commutator 22. Included in the structure are brush carriers 23 and 24 operatively supporting brush terminals 26 and 27 in engagement with the commutator, the brushes normally being urged to a firm electrical contact with the latter, by suitable coil springs 28. For a more detailed disclosure of the structure of this pump, reference is directed to the aforementioned Korte and Lannert patent. However, for present purposes, it is indicated that the commutator 22 and at least the contacting end portions of the brushes are exposed to and bathed in the gasoline in fuel tank 10, as this is illustrated in Fig. 3, showing the submerged condition of these elements in the fuel body 30.

With reference now to the diagrammatic developed view of the commutating elements, as presented by Fig. 4, the commutator proper is comprised of segmental elements or bars 31 formed preferably of copper, and each electrically insulated from adjacent bars by suitable separators 32 of insulating material. The armature winding shown for convenience as being comprised of serially-connected coil elements 34, is suitably arranged in the coil slots of the armature (not shown) and each coil is connected by conductors 35 to an adjacent pair of the commutator bars 31. The positive brush 26 and negative brush 27 in operative engagement with the commutator, occupy a predetermined fixed position in the motor structure, which in the low voltage direct-current motor under consideration, may be on or near the neutral axis of the machine. For present purposes and as appears in Fig. 4, the commutator moving in the direction of the arrow, is shown in a position wherein the segment 31 at the trailing edge 36 of the negative brush 27, as well as the bar or segment 31 at the trailing edge 38 of the positive brush 26, is about to leave or break-away from brush contact.

It has been found in connection with the operation of a motor while submerged in fluid such as gasoline, that commutation difficulties with respect in particular, to commutator wear and brush arcing with consequent damage to the commutator segments as well as to the brush, are more pronounced than in the case of motors operating in the presence of air, and that arcing and resultant commutator burning or destruction, is much more prevalent at the negative brush. Moreover, it appears that such commutating provisions as are known and usually employed in motors operating in air, and which include brush structures of carbon, graphite or other similar material, with or without metal content, presenting characteristics affording substantially arcless conditions at the brushes and a minimum of commutator wear, are ineffective or unsatisfactory when applied to submerged motor operation.

With the foregoing in view, the present improvements afford positive and negative brushes of dissimilar resistance characteristics. The negative brush by present preference, is formed of carbon without metal content, while the positive brush may have some metal therein and further, the construction of these brushes is such that the longitudinal resistance, i. e. in the direction of main current flow through the brush, of the negative brush is greater to a predetermined extent than that of the positive brush. For example, where the motor is to be connected to a low voltage supply circuit such as prevails in automotive practice, the longitudinal resistance of the negative brush may have an approximate ohmic value of .062, while that of the positive brush may be approximately .0023. Consequently in the present example, the longitudinal resistance differential of the brushes may be of the order of 27:1, since with this differential, there appears a marked improvement in commutation. However, the occurrence of arcing is not satisfactorily eliminated thereby, because as appears in submerged motor operation in particular, the short circuit current set up in an armature coil undergoing commutation, and passing from one commutator segment to the next through the bridging brush, may not be effectively suppressed to a minimum or negligible value or otherwise practically eliminated, solely by control of the longitudinal brush resistance within practical operating limits predicated on efficiency of motor function, brush strength and mechanical wear thereof, and frictional wear of the commutator surfaces by the brush. It is this short circuit current which when not controlled effectively, gives rise to arcing at the brushes, appearing more particularly at the trailing edge of each brush as a commutator segment passes from beneath or breaks away from the brush.

As above noted in respect to submerged operation, a very much greater tendency to arcing is encountered at the negative brush, and when permitted to occur, is particularly destructive of the commutator segments, burning and pitting these elements to a serious degree. Under certain conditions, as when the short-circuit current reaches high values, the arcing may be so intense as to result in a tearing out of metal particles of more or less appreciable size, from the commutator segments. When this occurs, at least some of the particles may be transferred to and become partly embedded in the contact face of the brush, so that the commutator may be not only pitted, but additionally damaged through greatly increased frictional wear and scratching by the rough edges of the metal particles transferred to the contact face of the brush.

When as before indicated, determining the relative longitudinal resistance of the brushes such that this resistance is greater in the negative brush, serves to improve the commutating function in a submerged motor, as well as to reduce the tendency to arcing, an effective suppression or a practical elimination of arcing at the brushes and more importantly at the negative brush, is afforded by the present improvements through further resistance control of the commutating function. To this end, the negative brush 27 is formed such as to have a contact resistance of a relatively high order, this resistance of the brush as distinguished from the longitudinal resistance thereof, being indicated in an illustrative sense, by the heavier or darker shading of the brush at 39 in the region of the brush face 40 (Fig. 4). The ohmic value of the contact resistance factor in the negative brush which may be considerably greater than the contact resistances of ordinary or the usual carbon brushes utilized in similar motors running in air, is determined in accordance with a given motor, as the small low voltage pump motor herein exemplified, to be materially greater than the longitudinal resistance of the brush, and to be productive of a relatively high voltage drop between the brush and commutator surfaces, sufficient to keep the short-circuit current at a low value or within non-arcing limits, but without affecting too adversely, normal and satisfactorily efficient operation of the submerged motor. Since the short-circuit current, indicated for example, by the small arrow 42 in Fig. 4 bridging the adjacent commutator segments 31a and 31b through the negative brush 27, is established by and proportional to the self-induced electromotive force in the armature coil, as 34a, undergoing commutation, the effective suppression of the short-circuit current is here the result of control of the self-induced electromotive force of the commutating coil by the increased voltage or ohmic drop at the brush contact surface, attained by predetermining the brush contact resistance at an appropriately high value. For the low voltage motor herein considered by way of example, the ohmic value of the negative brush contact resistance may be approximately .11, this value having been determined and found to afford almost complete suppression of brush arcing under the condition of submerged motor operation.

In a similar manner, arcing at the positive brush 26 is here inhibited or practically eliminated by forming the brush to have a contact resistance of a value which may be appreciably greater than the longitudinal ohmic resistance of the positive brush, but which is materially less than the contact resistance of the negative brush. As an example thereof and with respect to the low voltage motor under present consideration, the contact resistance of the positive brush may be and preferably is of the order of .02 ohm. Similarly to the negative brush, the contact resistance of the positive brush as distinguished from the longitudinal resistance thereof, is indicated by the heavier or darker shading at 43 in Fig. 4. Although arcing at the positive brush, while detrimental to good commutation and motor function, appears in the case of a submerged motor, to be much less intense when uncontrolled and hence less destructive, nevertheless if permitted, such arcing while found to have only a small burning effect on the commutator, in some instances to a negligible extent, tends to produce marked pitting of the brush contact surface. Particles of the brush thus torn out, may be more or less completely washed from the commutator surface by the surrounding gasoline, but as has been encountered, a few of such particles will cling to the commutator surfaces and be carried around to the negative brush. When this occurs and particularly after long use of the motor, the carbon deposit on the commutator (with metal particles if the brush is of carbon-metal composition) may reach serious proportions, "dirtying" the commutator to the point of impairing motor operation. In fact, some of the positive brush particles will become embedded in the contact face of the negative brush, and consequently through accumulation therein, will alter the electrical characteristics of the latter brush to the detriment of the commutation function. However, the present provisions avoid any occurrence of the above mentioned detrimental conditions, by affording in the manner described, substantially arcless commutation at the positive brush.

As found in gasoline submerged operation of an electric motor, as the low voltage fuel pump motor given as an example herein, the provision of a positive brush having longitudinal and contact resistance values materially less than the corresponding values of the negative brush, enables the use of a negative brush presenting a high voltage drop at its contact with the commutator, such as to afford effective arc-suppression or elimination of arcing in normal motor operation, without unduly affecting or reducing the power capacity of the motor. In connection with the foregoing, the present improvements afford a further means for assuring normal satisfactory power operation of the motor equipped with brushes of the characteristics described. The resistance of the armature coils 34 is here reduced, as by the use of coil wire of increased cross-section, so that the overall resistance of the armature winding may be less than that normally provided in similar motors intended for operation in the presence of air. However, since the ohmic drop in each armature coil when undergoing commutation, is a factor in the control of the self-induced electromotive force of the coil, the coil resistance is decreased only sufficiently to assure good motor operation without materially detracting from the arc-suppressing effect of the high contact resistance of the negative brush in particular.

By means of the brush and commutator structure as now described, an electric motor such as the fuel pump motor herein exemplified, may be operated submerged in gasoline for long periods of time, with no more than a normal or unavoidable minimum of frictional brush wear of the commutator elements. Further, arcless commutation is practically assured, and the general power efficiency of the motor is maintained. As to the brush elements herein described, these may be constructed by methods known to brush manufacturers, to present the required distinct longitudinal and contact resistance characteristics above described, and to afford adequate brush strength and durability, without causing excessive frictional wear of the commutator.

Various modifications may be made as will occur to those skilled in the art, and the exclusive use of all modifications as come within the scope of the appended claims is contemplated.

What we claim is:

1. A dynamo-electric machine having a commutator and positive and negative brushes, the brushes being of conducting material and formed to characterize the positive brush by longitudinal and commutator contact resistances differing in ohmic value, and the negative brush by distinct longitudinal and commutator contact resistances, with the latter resistance exceeding in ohmic value, the corresponding resistance of the positive brush.

2. A dynamo-electric machine having a commutator and positive and negative brushes, the brushes being of conducting material and formed to characterize the positive brush by distinct longitudinal and commutator contact resistances, and the negative brush by a longitudinal resistance differing in ohmic value, from the corresponding resistance of the positive brush, and a commutator contact resistance substantially greater than that of the positive brush.

3. A dynamo-electric machine having a commutator and positive and negative brushes, the brushes being of conducting material and formed to characterize the positive brush by distinct longitudinal and commutator contact resistances, and the negative brush by distinct longitudinal and commutator contact resistances each substantially greater than the corresponding resistance of the positive brush.

4. A dynamo-electric machine having a commutator and positive and negative brushes, the brushes being of carbonaceous material and formed to characterize each by distinct longitudinal and commutator contact resistances, with the latter resistance greater than the longitudinal resistance, and the commutator contact resistance of the negative brush substantially greater than the corresponding resistance of the positive brush.

5. A dynamo-electric machine having a commutator and positive and negative brushes, the positive brush being of conducting material formed to characterize the brush by distinct longitudinal and commutator contact resistances, and the negative brush being of carbon substantially free of metallic content and formed to characterize the brush by distinct longitudinal and commutator contact resistances greater in ohmic values, than the resistances of the positive brush.

6. A dynamo-electric machine having a commutator and positive and negative brushes normally urged thereagainst, the positive brush being of conducting material formed to characterize the brush by a predetermined longitudinal resistance and a greater commutator contact resistance, and the negative brush being of carbon substantially free of metallic content and formed to characterize the brush by distinct longitudinal and commutator contact resistances, with the latter resistance substantially greater in ohmic value, than the corresponding resistance of the positive brush.

7. A dynamo-electric machine having a commutator and positive and negative brushes normally urged thereagainst, the positive brush being of carbon material formed to characterize the brush by a predetermined longitudinal resistance and a greater commutator contact resistance, and the negative brush being of carbon substantially free of metallic content and formed to characterize the brush by a longitudinal resistance greater in ohmic value, than the corresponding resistance of the positive brush, and a commutator contact resistance productive of a high ohmic drop at the brush contact with the commutator.

8. In an electric motor for operation submerged in a medium such as a hydrocarbon fluid, a metallic commutator and positive and negative brushes normally urged thereagainst, the commutator and brushes being exposed to the medium, each of said brushes being of conducting material formed to characterize the brush by distinct longitudinal and commutator contact resistances, and the commutator contact resistance of the negative brush being substantially greater than the corresponding resistance of the positive brush.

9. In an electric motor for operation submerged in a medium such as a hydrocarbon fluid, a metallic commutator and positive and negative brushes normally urged thereagainst, the commutator and brushes being exposed to said medium, said positive brush being of conducting material formed to characterize the brush by distinct longitudinal and commutator contact resistance, and said negative brush being of carbon formed to characterize the brush by distinct longitudinal and commutator contact resistances, wherein the commutator contact resistance thereof is substantially greater than the corresponding resistance of the positive brush.

10. In an electric motor for operation submerged in a medium such as a hydrocarbon fluid, a metallic commutator and positive and negative brushes normally urged thereagainst, the brushes and commutator being exposed to the medium, said positive brush being of carbonaceous material formed to characterize the brush by a predetermined longitudinal resistance and a greater commutator contact resistance, and said negative brush being of carbon substantially free of metallic content and formed to characterize the brush by a longitudinal resistance exceeding in ohmic value, the longitudinal resistance of the positive brush, and a commutator contact resistance substantially greater in ohmic value, than the commutator contact resistance of the positive brush.

11. In an electric motor for operation submerged in a hdrocarbon fluid such as gasoline, a metallic commutator and positive and negative brushes normally urged thereagainst, the commutator and brushes being exposed to the fluid, said positive brush being of carbon material formed to characterize the brush by a predetermined longitudinal resistance and a greater commutator contact resistance, and said negative brush being of carbon formed to characterize the brush by a longitudinal resistance exceeding that of the positive brush, and a commutator contact resistance productive of a high ohmic drop at the brush contact with the commutator.

12. In an electric motor for operation submerged in a hydrocarbon fluid, such as gasoline, a metallic commutator and positive and negative brushes bearing thereon, the brushes and commutator being exposed to said fluid, said brushes being formed of carbon and having distinct commutator contact resistances, with the commutator contact resistance of the negative brush greater in ohmic value than that of the positive brush in the order of six to one.

13. In an electric motor for operation submerged in a hydrocarbon fluid such as gasoline, a metallic commutator and positive and negative brushes bearing thereon, the commutator and brushes being exposed to said fluid, said brushes being formed of carbonaceous material and differing substantially in the longitudinal and commutator contact resistances thereof, with the commutator contact resistance of the negative brush exceeding in ohmic value the contact resistance of the positive brush in about the ratio of six to one.

14. A dynamo-electric machine having an armature winding and a commutator electrically connected thereto, positive and negative brushes normally bearing on the commutator, said brushes being of carbon material and formed to have distinct resistance characteristics, wherein the negative brush has a commutator contact resistance substantially exceeding in ohmic value the contact resistance of the positive brush, and said armature winding being formed such as to have a relatively low resistance.

15. In an electric motor for operation submerged in a hydrocarbon fluid such as gasoline, the motor having an armature winding and a commutator electrically connected to the winding, positive and negative brushes normally bearing on the commutator, the commutator and brushes being exposed to said fluid, said brushes being of carbonaceous material formed to characterize each by distinct longitudinal and commutator contact resistances, wherein the commutator contact resistance of the negative brush is substantially greater than the corresponding resistance of the positive brush, and said armature winding being characterized by a relatively low resistance.

16. In an electric motor, a commutator, and positive and negative brushes normally urged thereagainst, said brushes being constructed to have different commutator contact resistances and the commutator contact resistance of the negative brush being substantially greater than the corresponding resistance of the positive brush.

ALFRED C. KORTE.
ALEX N. SZWARGULSKI.

REFERENCES CITED

The following references are of record in the file of this patent:

UNITED STATES PATENTS

| Number | Name | Date |
|---|---|---|
| 641,012 | Heidel | Jan. 9, 1900 |
| 1,807,794 | Munday | June 2, 1931 |